United States Patent
Rahnama et al.

(10) Patent No.: US 8,661,081 B2
(45) Date of Patent: Feb. 25, 2014

(54) METHOD, APPARATUS AND SYSTEM FOR SOCIAL NETWORKING

(75) Inventors: Hossein Rahnama, Richmond Hill (CA); Alireza Sadeghian, Markham (CA)

(73) Assignee: Flybits, Inc. (CA)

( * ) Notice: Subject to any disclaimer, the term of this patent is extended or adjusted under 35 U.S.C. 154(b) by 475 days.

(21) Appl. No.: 12/921,625

(22) PCT Filed: Mar. 11, 2008

(86) PCT No.: PCT/CA2008/000475
§ 371 (c)(1),
(2), (4) Date: Dec. 14, 2010

(87) PCT Pub. No.: WO2009/111853
PCT Pub. Date: Sep. 17, 2009

(65) Prior Publication Data
US 2011/0125850 A1    May 26, 2011

(51) Int. Cl.
*G06F 15/16* (2006.01)
(52) U.S. Cl.
USPC .......................... 709/205; 705/319
(58) Field of Classification Search
USPC .......................... 709/205; 705/319
See application file for complete search history.

(56) References Cited

U.S. PATENT DOCUMENTS

| | | | |
|---|---|---|---|
| 5,086,394 A | 2/1992 | Shapira | |
| 6,088,435 A | 7/2000 | Barber et al. | |
| 6,542,749 B2 | 4/2003 | Tanaka et al. | |
| 6,542,750 B2 | 4/2003 | Hendrey et al. | |
| 6,549,768 B1 | 4/2003 | Fraccaroli | |
| 6,618,593 B1 | 9/2003 | Drutman et al. | |
| 6,819,919 B1 | 11/2004 | Tanaka | |
| 6,944,443 B2 | 9/2005 | Bates et al. | |
| 6,968,179 B1 | 11/2005 | De Vries | |
| 7,071,842 B1 | 7/2006 | Brady, Jr. | |
| 7,280,822 B2 | 10/2007 | Fraccaroli | |
| 7,310,676 B2 | 12/2007 | Bourne | |
| 2002/0140625 A1* | 10/2002 | Kidney et al. | 345/1.1 |
| 2004/0009750 A1* | 1/2004 | Beros et al. | 455/41.2 |
| 2005/0048961 A1* | 3/2005 | Ribaudo et al. | 455/419 |
| 2007/0008905 A1 | 1/2007 | Berger et al. | |
| 2007/0180127 A1 | 8/2007 | Vuori | |
| 2007/0282621 A1* | 12/2007 | Altman et al. | 705/1 |
| 2008/0004949 A1 | 1/2008 | Flake et al. | |
| 2008/0056215 A1* | 3/2008 | Kopikare et al. | 370/338 |

FOREIGN PATENT DOCUMENTS

WO    2008/000043    1/2008

OTHER PUBLICATIONS

A. K. Dey, G. D. Abowd & D. Salbe, "A Conceptual Framework and a Toolkit for Supporting the Rapid Prototyping of Context-Aware Applications" Human-Computer Interaction, vol. 16, No. 2, 3 & 4, pp. 97-166, 2001.

(Continued)

*Primary Examiner* — Thomas Dailey
(74) *Attorney, Agent, or Firm* — Fish & Associates, PC

(57) ABSTRACT

A method, apparatus and system for social networking is provided. In an embodiment, the system comprises a plurality of mobile devices that can directly connect to each other via a peer-to-peer connection. The devices can additionally connect a server. The server maintains a profile schema which can be used to generate profiles for users for each of the mobile devices.

10 Claims, 12 Drawing Sheets

(56) References Cited

OTHER PUBLICATIONS

C. J. Hsu, Y. J. Joung, "An ns-based Bluetooth Topology Construction Simulation Environment, Proceedings of the 36th annual symposium on Simulation ANSS '03" pp. 145, 2003.

R. Bruno, M. Conti, E. Gregori, "Wireless access to internet via Bluetooth: performance evaluation of the EDC scheduling algorithm", Proceedings of the first workshop on Wireless mobile internet WMI '01 pp. 43-49, 2001.

H. Rahnama, A. Sadeghian, and A. Madni, "Social Context Awareness in Ad Hoc System of Systems", Proceedings of the 2007 IEEE International Conference on System of Systems, 2007.

K. Harihar, S. Kurkovsky, "Architecture and distributed systems: Using Jini to enable pervasive computing environments" Proceedings of the 43rd annual Southeast regional conference—vol. 1 ACM-SE 43, pp. 188-193, 2005.

S. Helal, "Standards for service discovery and delivery" Pervasive Computing, IEEE, vol. 1, Issue: 3, pp. 95-100, Jul.-Sep. 2002.

Universal Plug and Play Specification, v1.0, http://www.upnp.org.

Leach, Paul J. "Network Working Group" Internet Draft—UUIDs and GUIDs—Feb. 24, 1997.

M. Paolucci, T. Kawmura, T. Payne and K. Sycara, "Semantic Matching of Web Services Capabilities", First Int. Semantic Web Conference, pp. 333-347, 2002.

Mehul Motani et al. PeopleNet: Engineering a Wireless Virtual Social Network. MobiCom'05, Aug. 28-Sep. 2, 2005, Cologne, Germany.

Bose, R. et al., "Marauder's Map—Bringing People Together", IEEE, Proceedings of the 2007 International Symposium on Applications and the Internet Workshops, Apr. 2007.

* cited by examiner

METHOD, APPARATUS AND SYSTEM FOR SOCIAL NETWORKING

FIELD

The present invention relates generally to telecommunications and more specifically relates to a method, apparatus and system for social networking.

BACKGROUND

The proliferation of mobile devices is changing the way people interact. Mobile devices are also increasing in power, sophistication and features further changing the way people interact. Social networking is on application of how such interaction is evolving.

One area of evolution is matching algorithms, including ad hoc matching algorithms. The prior art indicates that most available ad hoc matching algorithms are primarily designed for infrastructure-based distributed systems and do not necessarily address the volatile and low power characteristics necessary for ad hoc networks. One example of such prior art (though it does not even address matching algorithms) is A. K. Dey, G. D. Abowd & D. Salbe, "A Conceptual Framework and a Toolkit for Supporting the Rapid Prototyping of Context-Aware Applications" Human-Computer Interaction, Vol. 16, No. 2, 3 & 4, pp. 97-166, 2001. ("Dey") Dey provides a conceptual framework for building generic context aware applications. Dey introduces a context toolkit and discusses how such a toolkit can be customized for different scenarios from an intelligent tour guide to a conference assistant. By detaching the sensory networks from the applications semantics, interfaces and information aggregators are created as a middleware. Also the type of location sensors can be changed to various technologies without changing the applications logic. This provides programmers the ability to build context aware applications and customize them with relatively few modifications. However, in Dey, location is the salient context and the ability of the system to deal with more complex contexts and its scalability is not currently proven.

US Patent Publication US 2007/0008905A1 to Berger et al ("Berger") discloses a method that clusters a plurality of users in a mobile network according to a specific profile. Data regarding the user is allocated to each user. Data is exchanged between at least two users as soon as said users are located in a predefined communication range in order to spot users with profiles having a given content. Berger does not meaningfully address how prioritization of matches is performed. Berger also does not meaningfully address the handshaking process between the nodes. While Berger suggests that the proposed clustering model is possible through both Wi-Fi and Bluetooth, these protocols have different schemes in peer-pairing (handshaking) and usually pairing happens through sharing a key. If the pairing is overridden or disabled there are security concerns. Berger also does not meaningfully describe how users access to the same search templates, suggesting that perhaps Berger intends that the solution in Berger is hard-coded to devices and does not have the customization capability. Berger also does not discuss how data is exchanged and propagated between the nodes. Propagation of messages in an ad hoc network must follow certain principles and protocols, but Berger does not refer to any standard of how such interaction may happen. Also it should be noted that in Bluetooth communications, each Master Device can only be connected to up to a limited number of devices at the same time. Berger does not discuss how scheduling is performed when the number of nodes increase. Berger furthermore does not discuss scheduling models in building and connecting the mesh networks. This means that if the offered data is not in the range of protocol's discovery range, matchmaking would not happen.

U.S. Pat. No. 6,542,749 to Tanaka et al ("Tanaka") provides a method and system for connecting proximately located telecommunications units. The method and system may be used in a location aware telecommunications system that can determine the location of a telecommunications unit (TU) being used within the system. A user may be connected to one or more other users when they have compatible attributes and when they are located within a predetermined distance of each other. The connection may be established between TUs of two or more users, based on attribute and distance information maintained by a server computer, upon the request of an initiating user's TU.

Tanaka can be used for processing of passive information but Tanaka does not meaningfully disclose real time information processing. Tanaka, unlike Berger, also relies on a centralized framework, and relies on a preexisting communications infrastructure such as a core mobile network like a Global System for Mobile communications (GSM) network, or a Code Division Multiple Access (CDMA) network, or Universal Mobile Telecommunications Service (UMTS). Other types of core mobile network indication infrastructures will occur to those of skill in the art. Tanaka may potentially suffer from a high network latency since any point of failure in the core mobile network can impact communication throughput. Another aspect of Tanaka is that the location of mobile are determined by the telecom base stations, which can impact granularity of locations. Column 9, lines 45 through 65 of Tanaka provides general description of matchmaking algorithm which is used in any networking system but such an algorithm can be further expanded. Tanaka also focuses on a scoring model that is based on degrees of separations but the inventors believe there is a need for different scoring models.

U.S. Pat. No. 5,086,394 to Shapira (Shapira) provides an introduction system for participating users, includes for each user a personal device that is subject to activation by remote paging. Each user, also has a memory device that contains personal data defining the user by personal characteristics such as traits and interests, A local control unit receives the personal data from a plurality of user memory devices and using computer means compares the personal data of each user with the personal data of other users who have within the same time frame entered their personal, data into the local control unit via their respective memory devices. Pairs who are matched to standards by the computer comparison are automatically paged via their personal devices and an introduction is facilitated.

Like much of the prior art, Shapira is based on a centralized infrastructure model which means it can suffer from the same points-of-failure issues as in Tanaka. Tanaka can have somewhat limited flexibility as Shapira focuses more on a hardware/device design rather than an a software solution. Shapira is further focused on a dating scenario impeding customization for other contexts. For Shapira, data and profiles are entered into a central server prior to meeting time (Not ad hoc and spontaneous communications). Attributes are not stored on nodes/devices themselves but retrieved from the server.

Current literature survey indicates that most available ad hoc matching algorithms are primarily designed for infrastructure-based distributed systems and do not necessarily address the volatile and low power characteristics necessary for ad hoc networks. PeopleNet (in peopleNet: wireless virtual social network. In Proceedings of the 11th Annual international Conference on Mobile Computing and Networking (Cologne, Germany, Aug. 28-Sep. 2, 2005) suggests that a potentially successful social network is location, community and time specific. It provides a comparative analysis of candidate algorithms for design parameters and produce valid results. Despite the fact that the network architecture and propagation paradigms are well defined, practical aspects of network/user interactions are overlooked. PeopleNet does not take into account the multi-step authentication of communications protocols such as Bluetooth and its resulting complications in building efficient spontaneous social networks. The framework proposed in PeopleNet, also ignores the nodes' limited battery capacity by introducing an always-on power management policy.

The inventors responsible for the present specification would like to mitigate or obviate at least one of the disadvantages of the prior art.

SUMMARY

The present specification provides a method, system and apparatus for social networking. The method system and apparatus can be invoked in real time and can be spontaneous.

In an aspect, this present specification provides a method, system and apparatus for social networking that creates awareness in an ad hoc environment without the requirement for location awareness. An architecture is provided which can enable customized search and retrieval in different scenarios and can give the user the ability to switch contexts from one environment to another. The ability to switch contexts can be automatic, whereby the device belonging to the user automatically detects a given service area and invokes the appropriate profile template. This awareness can enhance current location based services, which suffer most from inaccurate localization, not by giving a more accurate location, but by giving supporting context in identifying locus. As an example, the locus can be a fuzzy radius with additional information such as color, shape and other attributes related to that radius. Proximity information can, in certain circumstances, be as valuable as the information retrieved from a centralized system such as search engines. The method, system and apparatus for social networking can provide ability to generate real-time and useful semantics in the proximity of users.

In the proposed architecture, providers, such as conference organizers, social clubs or academic institutions are able to create scenario-based profiles using the provided web service. These profile templates can then be made available to mobile users either from websites or by using available wireless data networks. As indicated above, the profile template for a particular service area can be automatically loaded onto the relevant device. The matching engine on the hand-held device can be configured in a generic manner and can customize itself to any scenario being sent to it. Also, the user is capable of switching between scenarios depending on the context. For instance the user can activate the social profile in a social gathering and later activate a particular conference profile to find a person with a particular research interest in a conference setting.

The provided system can be switched from various social scenarios to other potential scenarios such as non-centralized autonomous land mine detection operations in military and homeland security environments.

In other aspects, a framework and an algorithm is provided for generation and interpretation of contexts in dynamic ad hoc networks. Multi-criteria and priority matching schemes are provided. A visualization engine attached to the framework for enhanced representation of semantics in ad hoc networks is also provided. The provided system can enable social context awareness in ad hoc networks and facilitate additional communications to the end-user, ultimately reducing reliance of the user on restrictive networks (e.g. operators data networks).

DETAILED DESCRIPTION OF THE EMBODIMENTS

Figure 1:
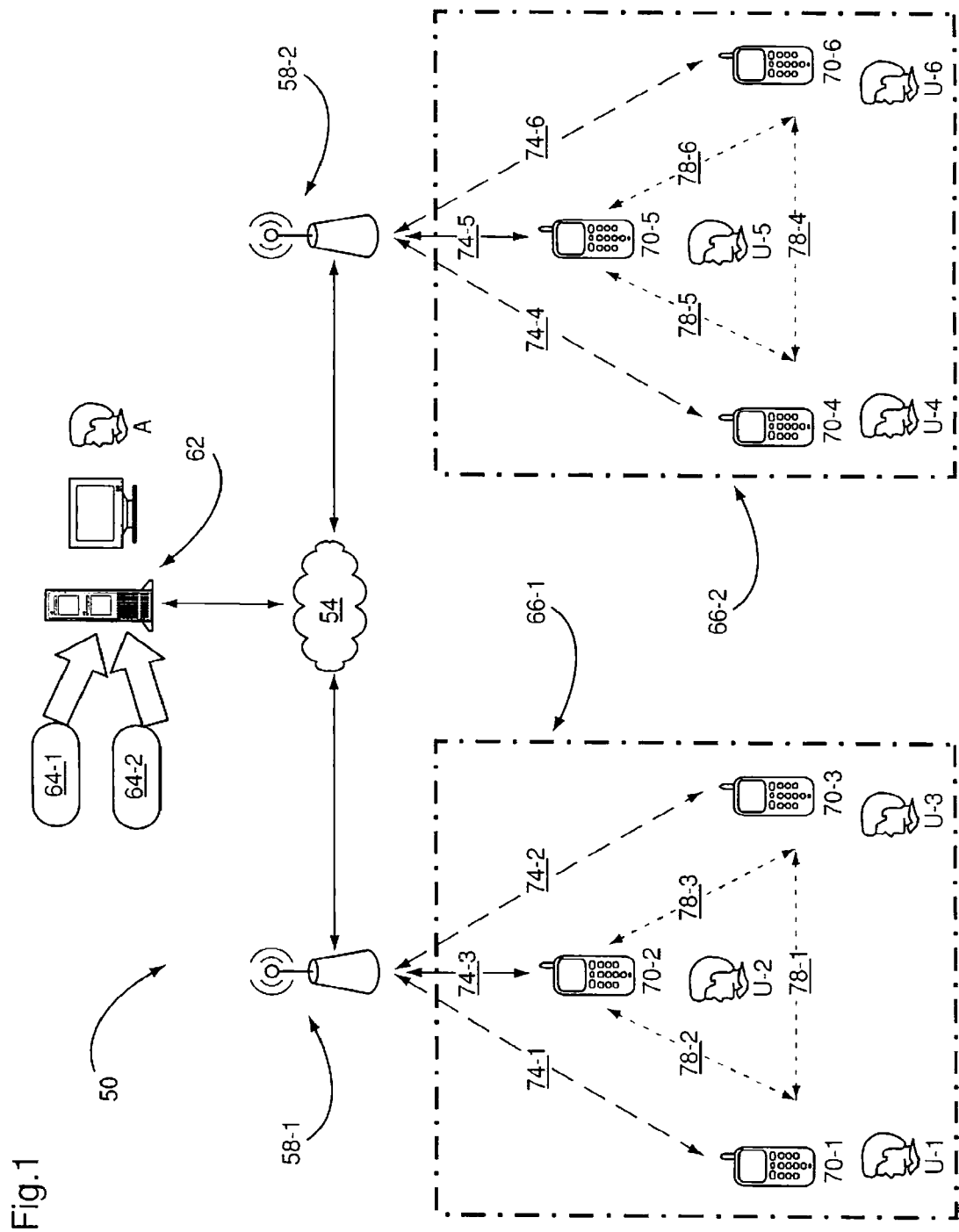
FIG. 1 shows a system for social networking.

Referring now to FIG. 1, a system for social network is indicated generally at 50. System 50 comprises a network 54 at its core that interconnects a plurality of base stations 58-1, 58-2 and an administrative server 62. (Base stations 58-1, 58-2 are collectively referred to as base stations 58, and generically as base station 58. This nomenclature is used elsewhere herein.) Each base station 58 has a respective service area 66, and each service area 66 includes a plurality of mobile devices 70, each device operated by a respective user U. Each mobile device 70 can connect to its respective base station 58 via a respective first wireless link 74. Each mobile device 70 an also connect on a peer-to-peer basis with each other mobile device 70 via a second wireless link 78.

As will be explained further below, each service area 66 can represent any area where a plurality of users U with devices 70 may wish to socially network. Thus, within service area 66-1, it is contemplated that users U-1, U-2, U-3 respective to devices 70-1, 70-2 and 70-3 may wish to socially network. Likewise, within service area 66-2, it is contemplated that users U-4, U-5, U-6 respective to devices 70-4, 70-5 and 70-6 may wish to socially network.

What defines a given service area 66 is not particularly limited. For example, service area 66-1 may comprise the floor space of a conference of academic context where users U-1, U-2 and U-3 may wish to locate other academics of like mind and interests. This means that the templates generated by server 62 for service area 66-1 are based on attributes such as research area and affiliations whereas in another example, service area 66-2 may comprise the floor space of a night club where users U-4, U-5 and U-6 may be singles wishing to meet potential partners of like mind and interests and the templates generated by server 62 are based on attributes such as gender, age and relationship type. Network 54 can be based on the Internet, an internet, the public switched telephone network, a packet switched network or combinations of any of the foregoing. Network 54 links to base stations 58 and server 62 via any appropriate backhauls, whether wired or wireless.

Server 62 can be based on any desired computing environment consisting of any combination of hardware, firmware, operating systems and software. Exemplary servers include any of the servers offered under the Sun Fire™ product line from Sun Microsystems, Inc., 4150 Network Circle, Santa Clara, Calif. 95054 USA, or any other computing environment comprising one or more central processing units interconnecting random access memory (or other volatile storage), read only memory (or other non-volatile storage), hard discs (or other persistent storage), network interfaces, input device and output devices via a bus. The network interface permits server 62 to connect to network 54.

Server 62 is configured to maintain at least one instance of a template application 64, which is configured to interact with devices 70 in order to assist in the provision of social networking functionality amongst devices 70 within a given service area 66. In a present embodiment, server 62 maintains a first template application 64-1 respective to service area 66-1 and a second template application 64-2 respective to service area 66-2. Template application(s) 64 will be discussed further below.

Figure 2:
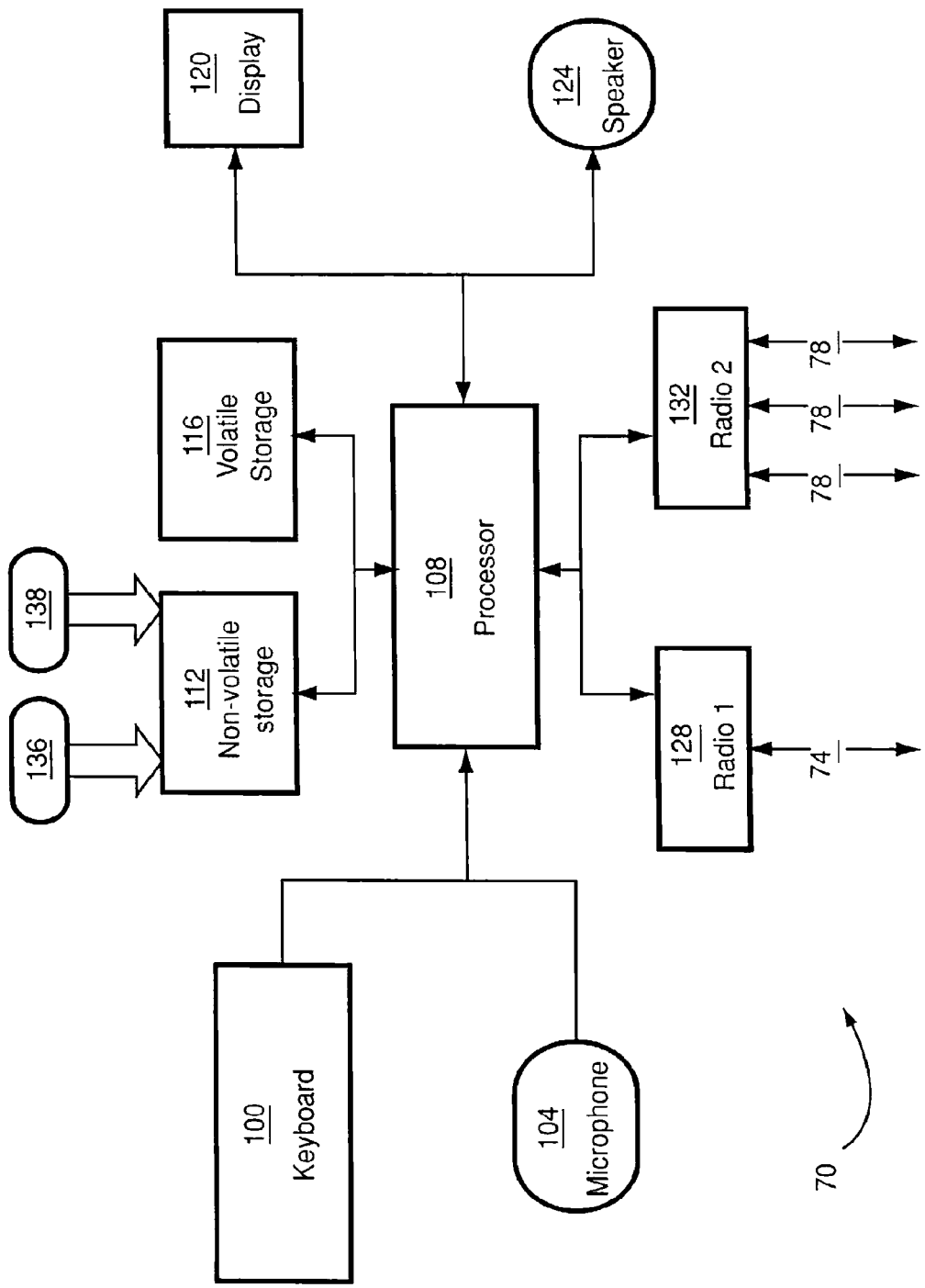
FIG. 2 shows a schematic representation of one of the mobile devices of the system of FIG. 1.

Each device 70 is based on the functionality of an enhanced mobile electronic device that includes at least data capabilities and typically would also include voice capabilities. Many well known cellular telephone models, or variants thereof, are suitable for the present embodiment. Referring now to FIG. 2, a schematic block diagram of each device 70 is shown. It should be emphasized that the structure in FIG. 2 is purely exemplary, and contemplates a device that be used for both wireless voice (e.g. telephony) and wireless data (e.g. email, web browsing, text) communications. Device 70 includes a plurality of input devices, which in a present embodiment includes a keyboard 100 and a microphone 104. Other input devices, such as a touch screen are also contemplated. Input from keyboard 100 and microphone 104 is received at a processor 108, which in turn communicates with a non-volatile storage unit 112 (e.g. read only memory ("ROM"), Erase Electronic Programmable Read Only Memory ("EEPROM"), Flash Memory) and a volatile storage unit 116 (e.g. random access memory ("RAM")). Programming instructions that implement the functional teachings of device 70 as described herein are typically maintained, persistently, in non-volatile storage unit 112 and used by processor 108 which makes appropriate utilization of volatile storage 116 during the execution of such programming instructions. Variants on device 70 can include a laptop computer equipped with wireless capabilities.

Processor 108 in turn is also configured to send output to a speaker 120 and a display 124. Processor 108 also contains a first radio 128 and a second radio 132. Conceptually, first radio 128 and second radio 132 can be thought of as network interfaces. First radio 128 is configured for communication via link 74, while second radio 132 is configured for communication via link 78. Thus, in a present embodiment each device 70 is a hybrid device that can communicate over link 74 and/or over link 78. However, in other embodiments, it is contemplated that first radio 128 can be omitted from device 54 so that device 54 can only communicate via link 78. It should be understood that in general a wide variety of configurations for device 70 are contemplated.

In a present embodiment, first radio 128 and link 74 are based on an area network topology, such as Institute of Electronic Engineers Standard (IEEE) 802.11 or its variants; or Bluetooth™, or based on a core mobile telephone network topology such as GSM, General Packet Radio Service (GPRS), Code Division Multiple Access (CDMA) or the like. It is contemplated that link 74 can carry data packets between device 70 and server 62. It will thus be appreciated that if link 74 is based on IEEE 802.11, then each base station 58 will also be an IEEE 802.11 base station. Likewise if link 74 is based on core mobile telephone network infrastructure, then base stations 58 will so correspond.

In a present embodiment second radio 132 and link 78 are based on a peer-to-peer network topology, such as Bluetooth™, but other peer-to-peer topologies are contemplated, including the peer-to-peer variants of IEEE 802.11.

Also in a present embodiment, devices 70 each maintain a copy of a peer-to-peer matchmaker application 136 in non-volatile storage 112. Peer-to-peer matchmaker application 136 can be loaded into volatile storage 116 and executed on processor 108. Peer-to-peer matchmaker application 136 on one device 70 is configured to interact with other peer-to-peer matchmaker applications 136 on other devices 70 that are in range over link 78. Peer-to-peer matchmaker application 136 is also configured to access templates generated by template application 64. Such templates can be accessed by each device 70 from server 62, whereby device 70 accesses server 62 via base station 58. Peer-to-peer matchmaker application 136 will be discussed further below.

Also in a present embodiment, devices 70 each maintain a visualization engine 138 that is also maintained in nonvolatile storage 112 which can take the results of social matching and generate a visual representation of the those results on display 120. Visualization engine 138 will be discussed further below.

Figure 3:
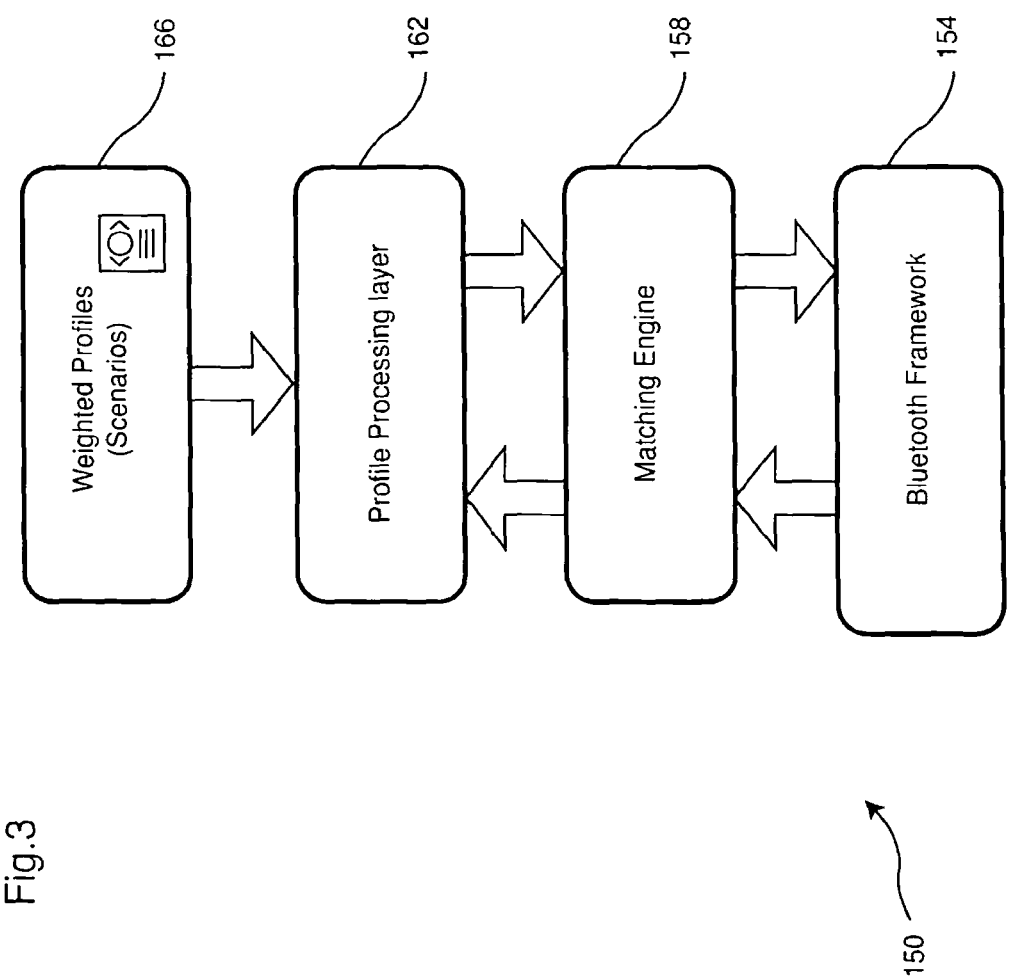
FIG. 3 shows an architectural framework for the system of FIG. 1.

Referring now to FIG. 3, a conceptual architecture for implementation on each device 70 in system 50 as indicated at 150. Architecture 150 includes four layers including: 1) a communications framework layer 154; 2) a matching engine layer 158; 3) a profile processing layer 162 and 4) a profile schema layer 166.

Architecture 150: a) is based on a free and peer-to-peer communications protocol; 2) has the ability to create a customizable matching engine that can parse standard templates for adaptation; 3) has the ability to model a service-based algorithm that allows search and retrieval without excessive user involvement and 4) utilizes local storage to reduce or obviate the need for a centralized arbiter.

In general, each layer will be discussed in further detail below. However, at this point it can be noted that while FIG. 3 labels framework layer 154 as Bluetooth framework layer, other communication protocols are contemplated including ZigBee, IEEE 802.11, and the like. It can be also noted that profile processing layer 162 can be based on a variety of different models including linear or fuzzy scoring or other scoring methodologies.

In a present embodiment, the free and peer-to-peer communications utilize Bluetooth and include a seamless real-time searching scheme to increase the usability of such Bluetooth devices in dynamic environments. In order to achieve usability, a present embodiment utilizes a matching process with minimal user intervention. Since Bluetooth normally has a pairing process that requires the user to continually approve connections, the present embodiment therefore implements a modified Bluetooth pairing process to make pairing process substantially seamless and the communication substantially secure. In a present exemplary embodiment, searching, (so that, for example device 70-1 can search for and locate device 70-2 or device 70-3) involves using L2CAP (as discussed in C. J. Hsu, Y. J. Joung, "An ns-based Bluetooth Topology Construction Simulation Environment, Proceedings of the 36th annual symposium on Simulation ANSS '03" pp. 145, 2003 ("L2CAP")) as the physical layer. Furthermore, a combination of SDP (as defined in R. Bruno, M. Conti, E. Gregori, "Wireless access to internet via Bluetooth: performance evaluation of the EDC scheduling algorithm", Proceedings of the first workshop on Wireless mobile Internet WMI '01 pp. 43-49, 2001) is used in combination with the transport control protocol over internet protocol (TCP/IP) for upper layers. A conceptual mechanism of seamless pairing is discussed in general, non-specific terms, in H. Rahnama, A. Sadeghian, and A. Madni, "Social Context Awareness in Ad Hoc System of Systems", Proceedings of the 2007 IEEE International Conference on System of Systems, Apr. 18-20, 2007.

Figure 4:
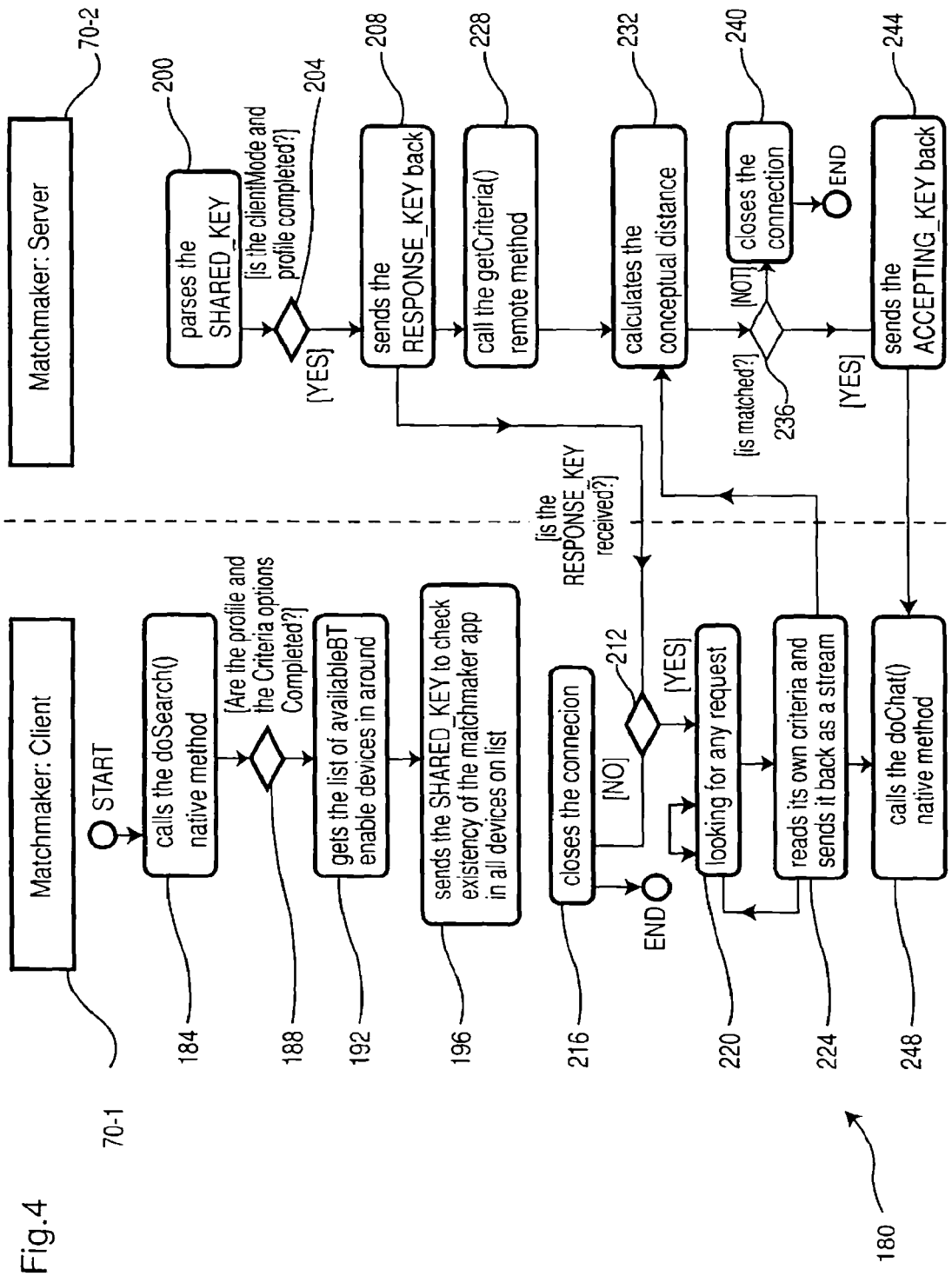
FIG. 4 shows a flow-chart depicting a method for social network that can be implemented using the system of FIG. 1.

FIG. 4 shows a method of social networking represented in the form of a flow-chart and indicated at reference 180. Method 180 generally reflects the functionality of matchmaker application 136. Method 180 can be implemented by enhancing the existing Bluetooth Service Discovery Layer or Service Discovery Protocol (SDP) working in conjunction with the Logical Link Control and Adapation Protocol (L2CAP) layer as defined in the Bluetooth Technical Specification, which can be obtained from http://www.bluetooth.com/Bluetooth/Technology/Building/Specifications. Note, however, that method 180 need not be implemented in this way.

Method 180 is a peer-to-peer method whereby one device 70 acts as a conceptual "client" while one or more other devices 70 act as a conceptual "server". The blocks on the left side of FIG. 4 thus reflect functionality within matchmaker application 136, which cause a particular device 70 to act as the conceptual "client", while the blocks on the right side of FIG. 4 thus reflect functionality within peer-to-peer matchmaker application 136 in a second device 70 to act as a conceptual "server". In FIG. 4, as specific nonlimiting example, device 70-1 is the conceptual client while device 70-2 is the conceptual server. FIG. 4 presumes that a template has been obtained from template application 64-1 by first device 70-1 and second device 70-2.

The search request is initialized by a first device 70 (the example given in FIG. 4 being device 70-1) using a flow-based technique indicated generally as method 180 in FIG. 4. The communication interactions can be divided into interactions between the first device 70-1 and a second device 70-2. Method 180 commences at block 184 at which point device 70 initiates a search. The search initiated at block 184 can be effected by configuring device 70 to call a method that is incorporated into the functionality associated with radio 132 of each device 70 which searches for other devices 70 that can be reached.

At block 188, a determination is made as to whether a profile associated with the user U of the device 70 has been completed by user U. Such a profile generally relate to any criteria or other information that identify user U and are usable in matching that particular user U with other users U within the same service area. Such a profile will have been previously entered by the user U into device 70 and stored within volatile storage 116 and/or non-volatile storage 112 of device 70. In a present embodiment the profile will correspond to a template obtained from template application 64-1. Profiles will be discussed in greater detail below. If the profile has not been completed then method 180 can be configured to "wait" at block 188 until such options are completed.

At block 192, a list of available device is received. Block 192 can be effected, by for example, device 70-1 engaging in a typical Bluetooth discovery process and discovering device 70-2. (It will now be appreciated that all devices 70 in system 50 can likewise discover each other where those other devices 70 are in range.)

At block 196, a shared key is sent to the other devices 70. The shared key is maintained within peer-to-peer matchmaker application 136 and is therefore known to all devices 70 that have matchmaker application 136 loaded thereon. In this manner, each device 70 can verify that all other devices within a given service area 66 also maintain the peer-to-peer matchmaker application 136 and therefore wish to participate in a social networking function.

Also as part of block 196, the shared key is sent to device 70-2.

At block 200, the shared key as sent at block 216 is parsed by device 70-2 for the purpose of verifying that the key matches the copy of the key as maintained at device 70-2.

At block 204 a determination is made as to whether the profile is completed. Block 204 is analogous to block 188 in that if the device 70-2 has an incomplete profile then the result of the determination at block 204 can be, for example, an exception where an error message is returned to device 70-2 (and/or device 70-1) and method 180 terminated.

If the determination at block 204 is yes then method 180 advances to block 208 and a response key is sent back to device 70-1. The response key, once received by device 70-1 permits devices 70-1 and 70-2 to actually pair with each other for the purposes of fulfilling the social networking functions described herein. At block 212, device 70-1 waits to receive the response key from device 70-2. If the response key is not received then a pairing to device 70-2 is considered to have failed and then, at block 216, the connection therewith is closed. (As a specific example of performance of block 212, assume that device 70-1 is performing block 212 and waiting to receive a response key relative to device 70-2. If no response key is received thus at block 216 device 70-1 will close the connection with device 70-2 by terminating link 78-2).

However, assume at block 212 the determination is "yes" because a response key was received from device 70-2, then method 180 advances from block 212 to block 220. At block 220, device 70-1 will look for requests from device 70-2 (or other relevant device 70). (As a specific example of performance of block 220, assume that device 70-1 has received the response key from device 70-2 confirming connectability with device 70-2. In this case, at block 220 links 78-2 will be active and device 70-1 will be listening for requests from device 70-2.)

At block 224, when a request is received, device 70-1 receiving the request will read its own profile and send that profile to device 70-2. (The profile referenced at block 224 is the same profile referenced at block 188). Thus, at block 224, the profile entered by the user U and stored within volatile storage 116 and/or non-volatile storage 112 of device 70-1 will be read by processor 108 of device 70-1 and sent to device 70-2.

At block 228, device 70-2 will make a call in order to obtain the profile stored in device 70-2.

At block 232, device 70-2 will implement a matching operation. A presently preferred matching operation will be discussed further below and involves determining a conceptual distance between each user U within a particular service area 66 based on the profile for each user U. In the specific example in FIG. 4, the conceptual distance will be made based on the completed profile as obtained from device 70-1 in relation to the stored profile within device 70-2.

At block 236, a determination is made if there has been a match as a result of the performance of block 232. If the determination at block 236 is no then at block 240 the connection with the relevant device 70-1 can, as desired, be closed. However, assume that at block 236 a "yes" determination is made, then at block 244 an accepting key is sent back to device 70-1. The accepting key represents that device 70-2 has made the match and ultimately signals to device 70-1 that device 70-2 is open to accepting the conducting of a chat dialogue (or other communication) between their respective devices 70.

At block 248, (which presumes a match has been made with device 70-2,) a user U of device 70-1 can invoke a chatting or other communicating function with device 70-2.

It should now be apparent that method 180 is presented in a simplified form. Of note is that in a typical implementation device 70-1 would also perform its own version of blocks 232, 236 and 244 in order to develop conceptual distances between device 70-1 and device 70-2 from the perspective of the user of device 70-1. It should now also be understood that the interactions in method 180 can be extrapolated to reflect interactions between multiple devices 70 within the same service area 66. In such cases of multiple interactions, there can be a single device (e.g. device 70-2) that is designated to act as the conceptual "server", while the remaining devices act as the conceptual "clients". Any suitable selection process can be invoked to select which of the devices 70 will be the conceptual "server".

It will now be apparent that method 180 can be varied and likewise that many specific design choices can be made relative to how to implement various blocks in method 180. For example, as previously discussed block 232 relates to the performance of a matching operation. Block 232 also corresponds to the matching engine layer 158 of architecture 150. An off-the-shelf matching operation that can be used for block 232 includes an appropriate modified version of the matching operations discussed in M. Paolucci, T. Kawmura, T. Payne and K. Sycara, "Semantic Matching of Web Services Capabilities", First Int. Semantic Web Conference, pp. 333-347, 2002. However, a more presently preferred matching operation is a novel matching protocol described below.

A presently preferred matching operation is performed by processing profiles with weighted attributes. These profiles include attributes which are predefined by the web service and are stored on the devices as eXtended Markup Language (XML) schemas. The selection or rejection of profiles is performed using a linear scoring model between the assigned attributes. Table I depicts an example of a simple profile created for a social interaction scenario. The user creates a search criteria and a scoring model is introduced to rank the selections.

TABLE I

SOCIAL MATCHING SCENARIO

User's Profile

| Name | Gender | Age Group | Hobbies | Image |
|---|---|---|---|---|
| John | M | 18-24 | A, B, C | John's Image |

Search Criteria

| Gender | Age Group | Hobbies |
|---|---|---|
| Female | 18-24 | A, B, C, D |

A profile allows each communicating node to calculate a numeric measure called the conceptual distance (CD). This is a score relating to common elements in users profiles, the higher the conceptual distance the more those nodes have in common. The conceptual distance calculation is the result of the multiplication of the Weight matrix (W) and the Profile Matrix (P). The weight Matrix is the importance of each attribute in that particular analysis, for example considering a dating profile comparison, finding a person of the opposite gender is more significant than finding someone of a similar age bracket therefore the weight matrix will reflect that with a higher weight connected to gender than age. This is demonstrated in Equation 1 which will resolve a conceptual distance for any profile matrix combination whether the elements of P or W are static or varying.

Equation 1

$$\begin{bmatrix} CD_1 \\ CD_2 \\ \updownarrow \\ CD_n \end{bmatrix} = \begin{bmatrix} P_{11} & P_{12} & \leftrightarrow & P_{1m} \\ P_{21} & P_{22} & \leftrightarrow & P_{2m} \\ \updownarrow & \updownarrow & & \updownarrow \\ P_{n1} & P_{n2} & \leftrightarrow & P_{nm} \end{bmatrix} \cdot \begin{bmatrix} W_1 \\ W_2 \\ \updownarrow \\ W_n \end{bmatrix} \quad (1)$$

$$CD(t) = P_{axm}(t) \cdot W(t)$$

The matching is performed by processing profiles with weighted attributes. These profiles include attributes which are predefined by the web service and are stored on the devices as eXtended Markup Language (XML) schemas. The selection or rejection of profiles is performed using the relevant attributes of those profiles. These can be of many forms including numeric, descriptive or abstract. Each attribute is fitted into a number of categories defined during the profile generation. This is shown in Table II.

TABLE II

NODAL CATEGORIES

| Category | Example | Description |
|---|---|---|
| Numeric | 1, 2, 3 ... Etc | A numeric manipulation based off a single value is performed |
| Numeric Range | 1-20 21-23 etc | A numeric manipulation based off a range of values is performed |
| List | Dancing, Climbing etc | A flexible list of traits is compared for similarities |
| Exclusive List | Male to Female | A predefined list of traits is compared for converse similarities |

Profile selection is an important part of the process as it involves explicitly defining the importance of each context to the overall system and defining the weights for the W matrix (see equation 1). Each context that affects the systems decision is considered. If any factors are overlooked or not included, then the system ignores them as being not applicable in making a determination.

The matrix P is resolved by comparing each nodes profile with every other node present in the system using algorithms defined in the profile. These cover a large range of comparisons in order to calculate conceptual distance effectively for use in a generic distributed system. Each attribute that applies to the system has associated with it, a comparison algorithm which is required for generating the systems profile matrix (Table III).

TABLE III

COMPARISON ALGORITHMS

| | Type | Comparison Algorithm |
|---|---|---|
| A | Numeric | $A(t) = 1 - \dfrac{(a_n(t) - a_m(t))}{fs}$ |
| B | Numeric Range | $B(t) = 1 - \dfrac{(b_n - b_m)}{N}$ |
| C | Exclusive List | $C(t) = c_n(t) \pm c_m(t)$ |
| D | List | $D(t) = 1 - \dfrac{\sum_{n=1}^{N} d_n \wedge d_m}{N}$ |

A(t) is the final score of two numeric values, $a_n(t)$ and $a_m(t)$. $a_n(t)$ is the main value, which is used to divide $a_n(t) - a_m(t)$, and obtain the relative difference. The absolute value is then subtracted from one, to obtain a percentage of the similarity, compared to the main value $a_n(t)$. B(t) is the final score of two numeric values, defined by their index in a predetermined range of numeric values. The index of the first value ($b_n$), is subtracted from the index of the second value ($b_m$). N is the total number of partitions in the range. Each index ($b_i$) will be $[0 \leq b_i \leq N-1]$. The relative difference and percentage is calculated similarly to A(t). C(t) is the score of two boolean values, with a predetermined score of opposite sign. The calculations of C(t) returns the absolute value of the difference between the two values, based on their score representations. In our example below, we chose 0.5 for Male and −0.5 for Female values, resulting in a score of one for opposite values, and a score of zero for matching values. D(t) is a direct comparison of string elements. The score is a result of counting how many of the primary list's elements ($d_n$) exist in the secondary list ($d_m$). The relative difference is calculated by dividing the number of matches by the number of elements in the primary list. The final score is produced as shown by Equation (1), by multiplying each individual score by its predetermined weight, and summed together.

Table IV shows the definitions associated with each profile's attribute. The P matrix's column becomes a calculation based off the type defined for it. For example, if first weight W1 was an age comparison, the profile would define it as a type Numeric or Numeric range therefore the results in the P matrix for column one would be the results of equation A(t) or B(t) where as if W2 was a comparison of gender the P matrix second column would be the results of C(t).

TABLE IV

DEFINITIONS

| Definitions | | Example |
|---|---|---|
| $a_n$ | Is the numeric value or function associated with the attribute | e.g. Age = 12 |
| $b_n$ | Is a numeric value associated with the range set the numeric value fills | $\dfrac{\{0 \text{ to } 20\}}{b=0} \vee \dfrac{\{21 \text{ to } 30\}}{b=1} \vee \dfrac{\{31 \text{ to } 40\}}{b=2}$ |
| $c_n$ | Is a single value tied to a binary comparison | Male = 0.5<br>Female = −0.5 or<br>Mobile = 0.5<br>Immobile = −0.5 |

TABLE IV-continued

DEFINITIONS

| Definitions | | Example |
|---|---|---|
| $d_n$ | is a range of skills/likes associated with the node | e.g Hobbies, |
| N | This is the number of objects in the data set | e.g. the Numeric range above has an N = 2 whilst the range of skills for D example N = 3 |
| n | Is the node doing the comparing | |
| m | Is the node being compared with n | |

Figure 5:
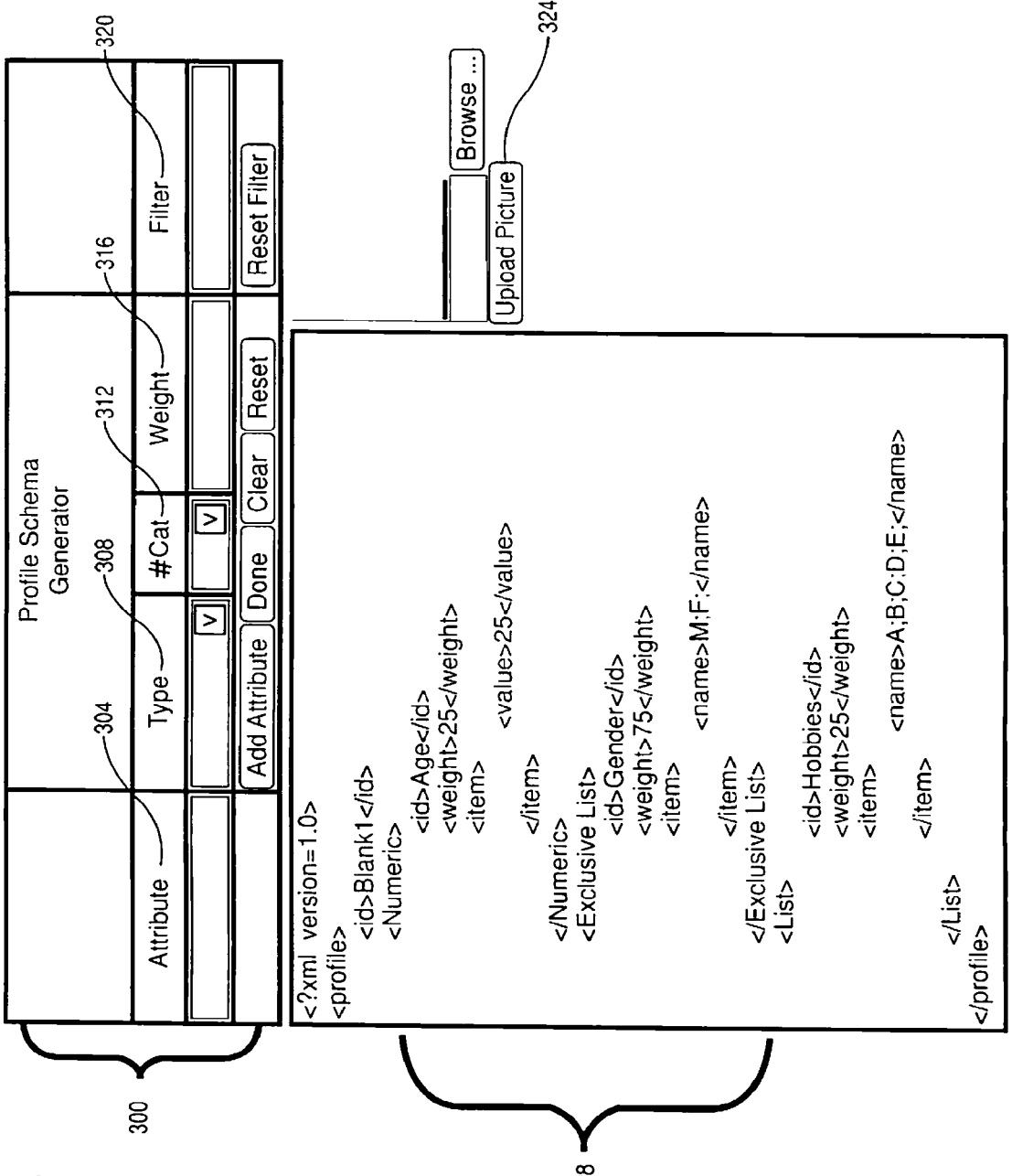
FIG. 5 shows an example of a profile schema generator.

Referring again to FIG. 4, recall that prior to performance of method 180 it was presumed that a profile for user U had been created, and that a verification of whether that profile had been completed was effected at block 188. (Note also that the profile schemas relate conceptually to profile schema layer 166 in architecture 150.) Profiles scenarios, which can be used to create profiles by individual users U, can be created using any appropriate or desired interface. In a presently preferred embodiment a web interface 300 is shown in FIG. 5 is used by administrator A operating server 62 to create various profile schemas. (Note that the profile schema creation relates conceptually to profile processing layer 162 in architecture 150.)

Web interface 300 comprises a plurality of fields including attribute 304, type 308, category 312, weight 316 and filter 320. An add-attribute-button allows administrator A to add additional attributes under attribute 304. Corresponding to each attribute 304, a type 308, category 312, weight 316 and filter 320 can be associated. An "upload picture" dialog box 324 can also be included so that a user U can provide a picture of themselves. The output of web interface 300 an XML file 328, which represents the particular profile schema that has been generated using interface 300.

A different profile schema can be created for service area 66-1 and a second for service area 66-2. It is the different profile schemas that conceptually separate matching server application 64-1 from matching server application 64-2. Thus, for example, providers of scenarios such as conference organizers are able to use this web interface 300 to create profile schemas, output in the form of XML file 328. The XML file 328 can then be sent to each device 70 in order to create a questionnaire which is completed by each user U to ultimately create a profile for that user U which is then stored on the respective device 70. (Alternatively, the XML file 328 can be sent to another device which is used by user U to generate the profile and then the generated profile can be downloaded to their device 70.)

Figure 6:
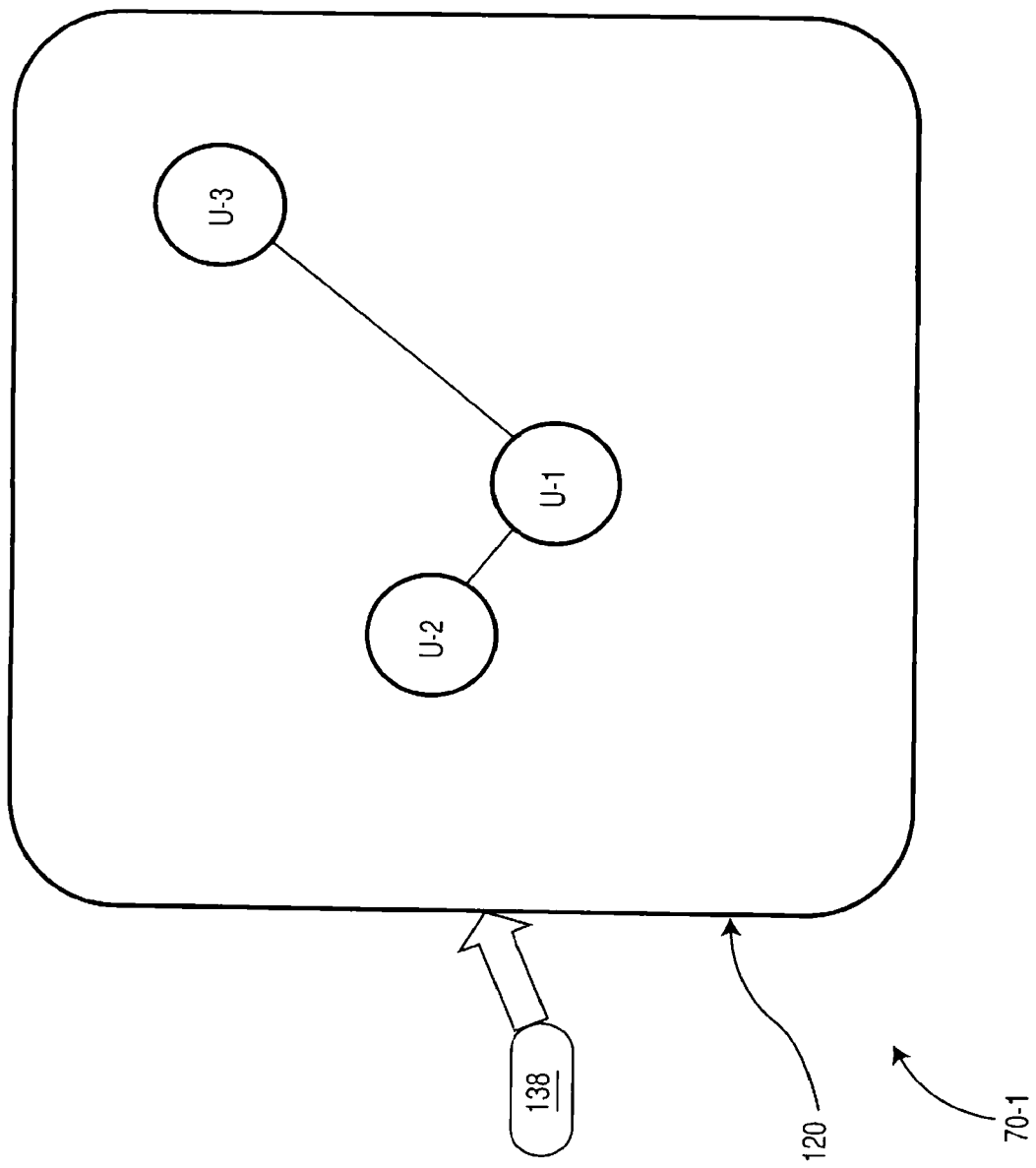
FIG. 6 shows an example of a visualization graph that can be generated on the display of a mobile device of the system of FIG. 1.
Figure 7:
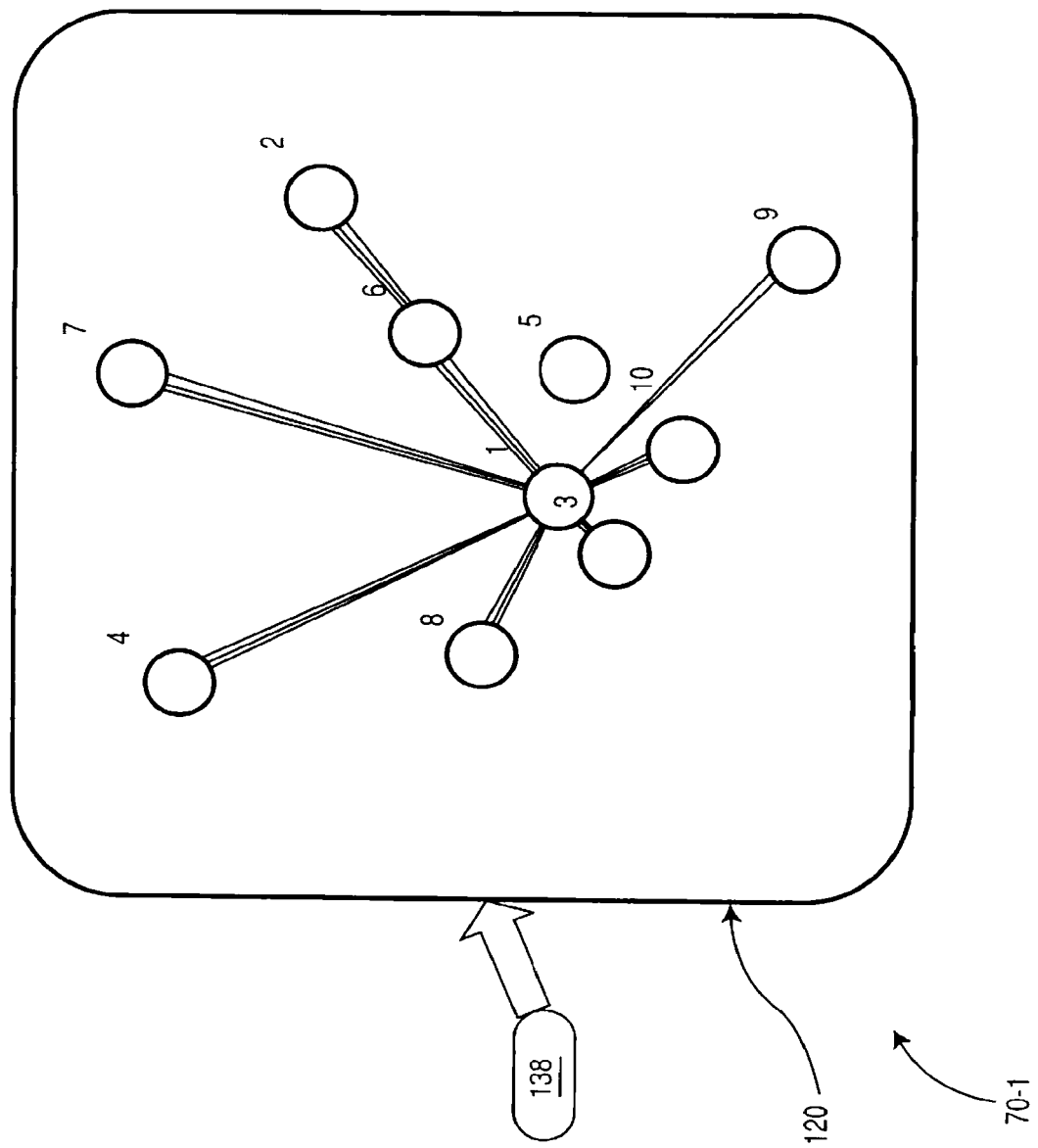
FIG. 7 shows a further example of a visualization graph.
Figure 8:
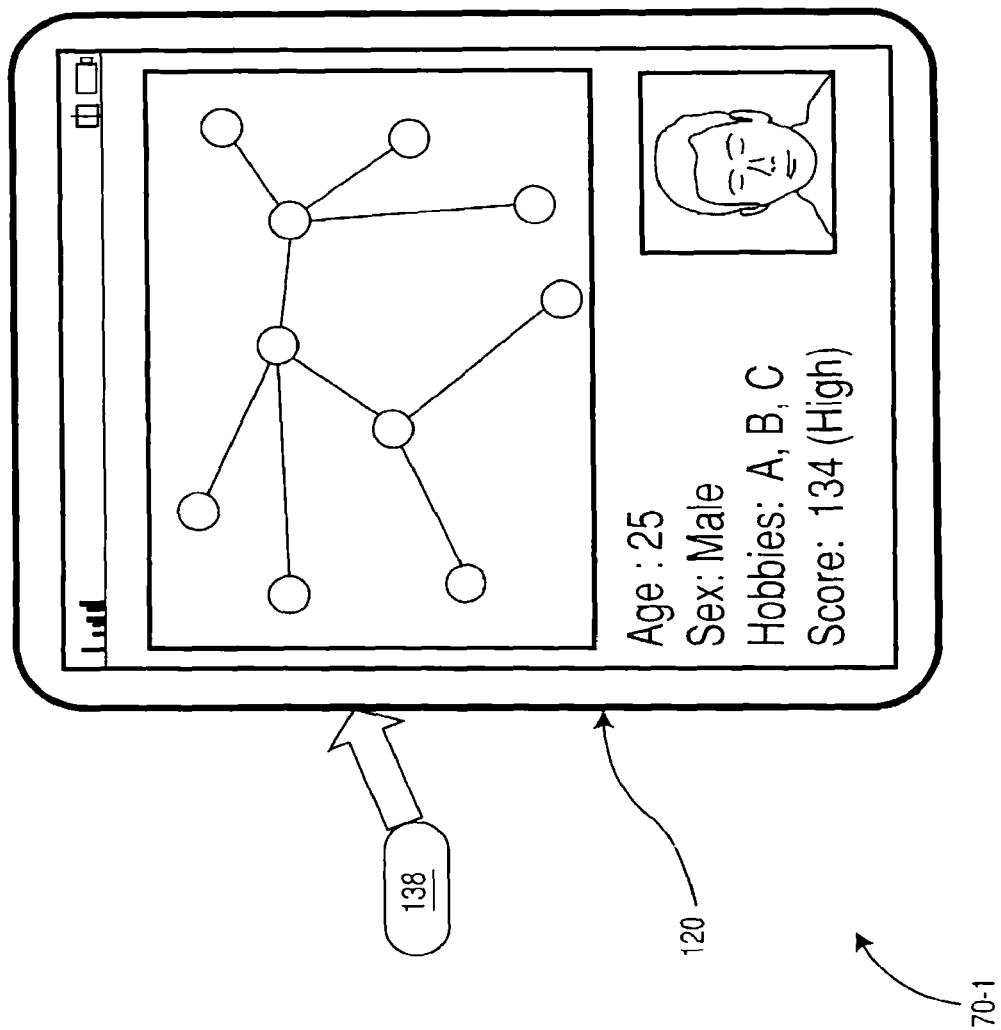
FIG. 8 shows a further example of a visualization graph and additional data that can be displayed on the mobile device of the system of FIG. 1.

Another embodiment provides visualization engine 138 so that results of social matching can be shown and analyzed easier by each user U. Visualization engine 138 is configured to calculate the matching scores of the nodes present in the proximity and create a social map including the conceptual distances between the nodes. Such social maps can be created and dynamically updated, spontaneously and in real-time. Visualization engine 138 can be based on any now known or future contemplated vector graphics engine including Java JSR226, openGL, DirectX and other 3D generator graphics engine. A simplified example of possible outputs of visualization engine 138 on display 120 of device 70-1 operated by user U-1 is shown in FIG. 6. In display 120 of FIG. 6, a node representing user U-1 is shown at the center, represent user U-1 himself. A second node representing user U-2 is shown connected to user U-1 and a third node representing user U-3 is shown connected user U-3. Note that in FIG. 6 the third node representing user U-3 is farther from the node representing user U-1 than the second node representing user U-2. This indicates that user U-2 is a closer conceptual match to user U-1 than user U-3. FIG. 7 shows a more complex example than FIG. 6, where there are ten users within the relevant service area 66 instead of just the three in FIG. 6. FIG. 8 shows a more complex example than FIG. 7, where ten users are shown within the relevant service area 66, and, in addition, the profile of the user U that has the best match to user U-1 of device 70-1 is shown as a twenty-five year old male, complete with a picture and list of hobbies of that best-matched user U.

Enhancements to the various inputs that can be created using visualization engine 138 are contemplated. For example, the output can be configured to indicate which users U are themselves searching for other users. The output can be configured to indicate that certain users are conceptually matched with each other, while at the same time indicating which of those very same users are willing to be contacted or approached.

Various case studies have been implemented using the teachings herein. The cases involved in the studies were calculated using a platform implementing the matching algorithms described above. The matching profiles utilizing the four key data types and score calculations, were sufficient to satisfy a social matching scenario, and successfully identify compatible profiles. This will provide the user with social context awareness about the surrounding people and indicates how far or close a user is to other nodes in terms of likes and dislikes.

Figure 9:
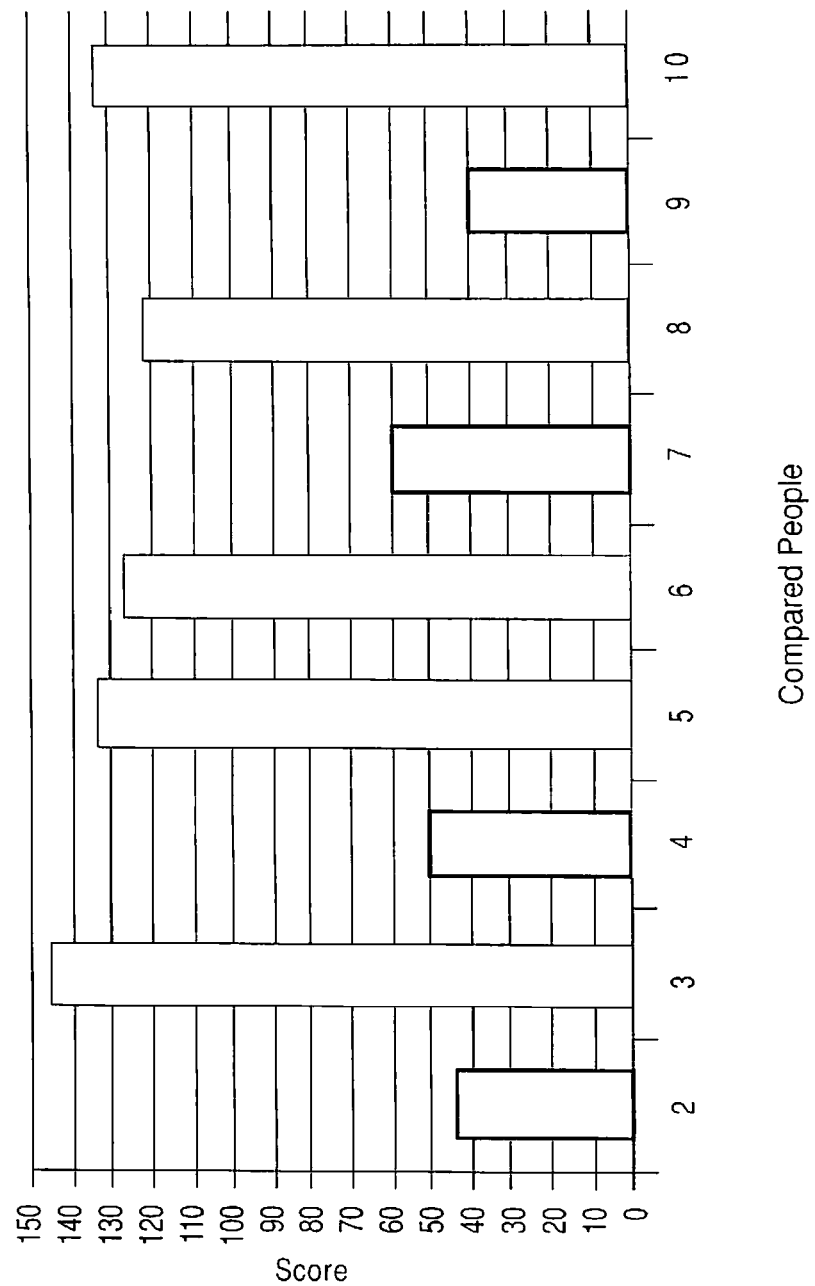
FIG. 9 shows a graph representing a score vs compared people for one person according to a case study.
Figure 10:
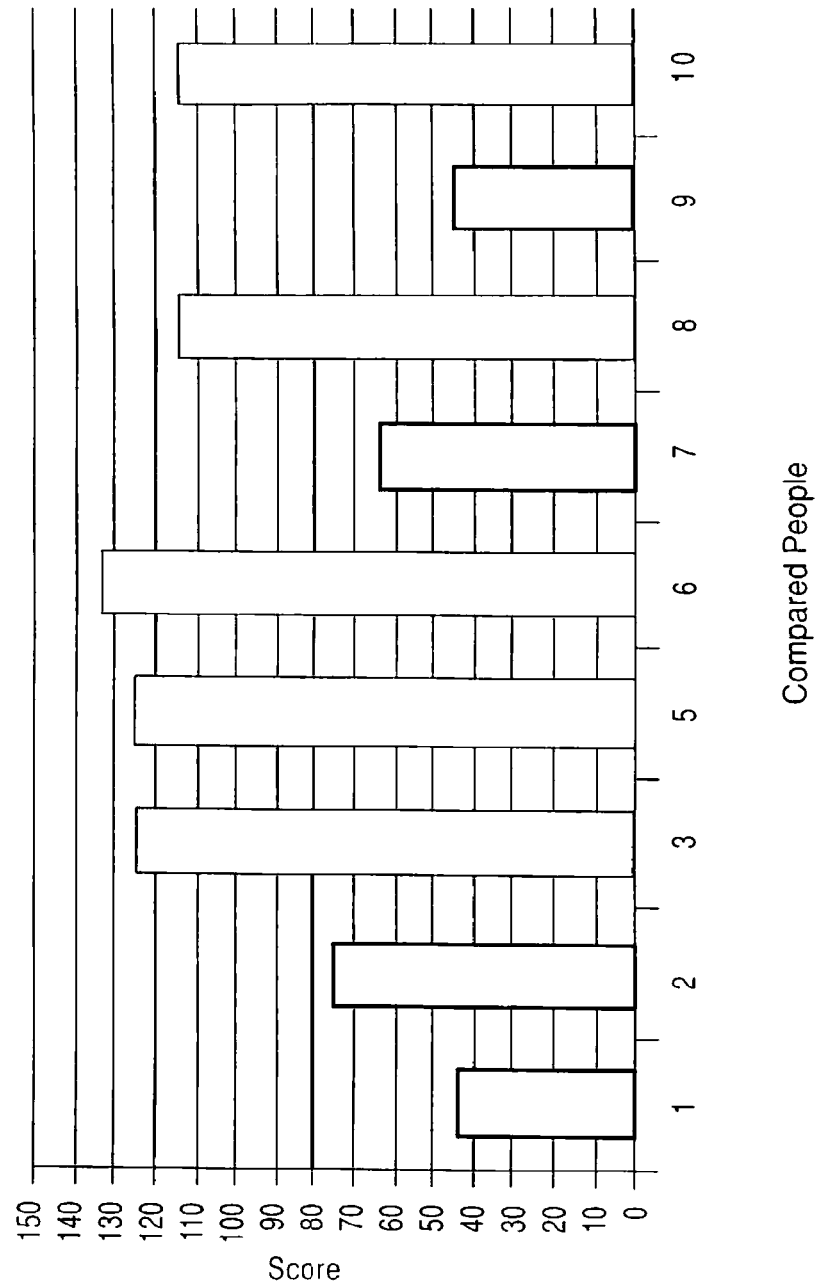
FIG. 10 shows a graph representing a score vs compared people for another person according to the case study.
Figure 11:
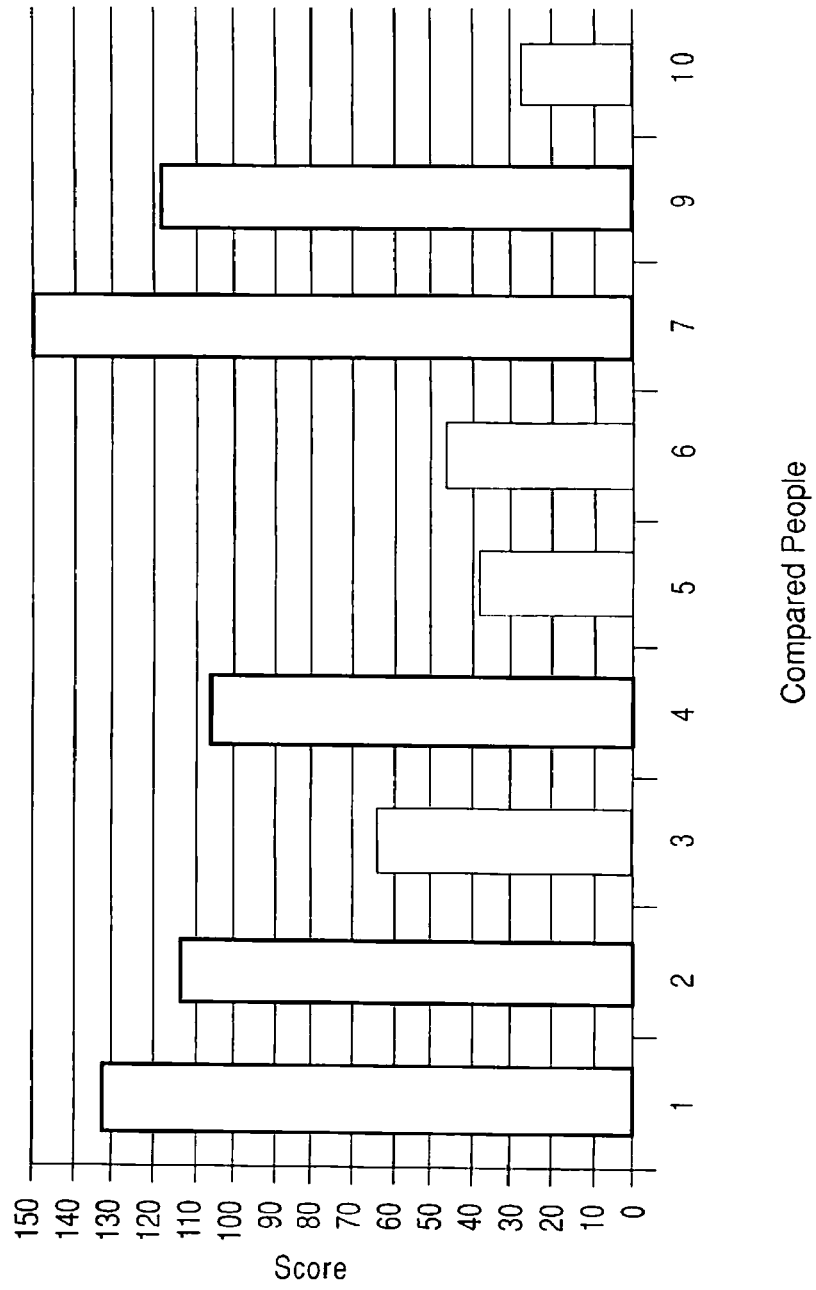
FIG. 11 shows a graph representing a score vs compared people for another person according to the case study.

Prototype user interfaces have been developed on Java-Enabled mobile phone and is shown in FIG. 8. Screen 120 is divided into two dynamic areas. The upper section generates a social map by polling adjacent nodes every five minutes (or other suitable time period) using Scalable Vector Graphics libraries available in the JavaME platform. In the current version of the prototype as shown in FIG. 8, the highest possible match in the social setting is shown in the lower portion of the screen and the user needs to press a button ("Next") to see the next highest match. For the study, an environment with ten gender-based profiles preferring heterosexual matches, and focused on two males and one female who are constantly polling other profiles for a match. Current prototype user interfaces are portable across mobile platforms including Symbian, Blackberry™ from Research in Motion Inc., and, as previously mentioned, Java phones, and it should be understood that the teachings herein are not specific to Java Enabled phones. In Java, three major JSRs are used including JS82 for Bluetooth, JSR226 for Graphics, JSR 177 for security and JSR172 for Web Services Tables V-VII and Graphs I-III (shown in FIGS. 9, 10 and 11 respectively) show the three weighted search criteria (Age, Hobbies and Gender) used to calculate the final conceptual distance in a social setting of ten people. (Note that users are referred to as persons or people in Tables V-VII and Graphs I-III). The lowest score of zero indicates the least desirable node. The sum of all weights identifies the top score of one-hundred-and-fifty, which indicates a perfect match. The graphs show high scores between opposite genders and low scores between the same genders. Such scores are the rudiments for generating the social graphs and represent the distances between the nodes.

Although, "Gender" with a high weight of seventy-five was the major criterion in obtaining the conceptual distances in scenarios defined in Tables V-VII, it is not the only matching factor. "Age" with the weight of fifty and "Hobbies" with the weight of twenty-five are subsequent factors in providing a more accurate match in accordance with the searcher's criteria. For instance in Table V, the best match for Person 1 is Person 3 with a high conceptual distance of 144.4 and the least desirable match is Person 9 with the low conceptual distance of 38.9. These conceptual distances are playing the key role in visualizing the social maps shown in FIG. 5. It is important to note that the default weight for each attribute is defined by the web service shown in FIG. 3. To be able to customize the search further, the user also has the ability to change the default weight values on the hand-held device to customize the search criteria. For example, in Table VI, the user can decrease the weight assigned to "Gender" and increase the weight assigned to "Hobbies" to prioritize the search to find people with hobby "D".

TABLE V

Search space and scores for person 1

| | Age | Hobbies | Gender | Score |
|---|---|---|---|---|
| Weights | 50 | 25 | 75 | |
| Person 1 | 25 (desired) | A, B (desired) | M | |
| 2 | 30 | C, D | M | 44.4 |
| 3 | 33 | A, B | F | 144.4 |
| 4 | 23 | D | M | 50 |
| 5 | 29 | B, C | F | 131.9 |
| 6 | 15 | A, D | F | 126.4 |
| 7 | 40 | A, B, C, D | M | 58.3 |
| 8 | 45 | A | F | 120.8 |
| 9 | 39 | C | M | 38.9 |
| 10 | 21 | B | F | 131.9 |

TABLE VI

Search space and scores for person 4

| | Age | Hobbies | Gender | Score |
|---|---|---|---|---|
| Weights | 50 | 25 | 75 | |
| Person 4 | 30 (desired) | D (desired) | M | |
| 1 | 25 | A, B | M | 44.4 |
| 2 | 30 | C, D | M | 75 |
| 3 | 33 | A, B | F | 125 |
| 5 | 29 | B, C | F | 125 |
| 6 | 15 | A, D | F | 133.3 |
| 7 | 40 | A, B, C, D | M | 63.9 |
| 8 | 45 | A | F | 113.9 |
| 9 | 39 | C | M | 44.4 |
| 10 | 21 | B | F | 113.9 |

TABLE VII

Search space and scores for person 8

| | Age | Hobbies | Gender | Score |
|---|---|---|---|---|
| Weights | 50 | 25 | 75 | |
| Person 8 | 45 (desired) | A (desired) | F | |
| 1 | 25 | A, B | M | 133.3 |
| 2 | 30 | C, D | M | 113.9 |
| 3 | 33 | A, B | F | 63.9 |
| 4 | 23 | D | M | 108.3 |
| 5 | 29 | B, C | F | 38.9 |
| 6 | 15 | A, D | F | 47.9 |
| 7 | 40 | A, B, C, D | M | 150 |
| 9 | 39 | C | M | 119.4 |
| 10 | 21 | B | F | 27.8 |

Our prototype's user interface is developed on a Java-Enabled mobile phone and is shown in FIG. 5(b). The screen is divided into two dynamic areas. The upper section generates a social map by polling adjacent nodes every 5 minutes using Scalable Vector Graphics libraries available in the JavaME platform.

In the current version of the prototype, the highest possible match in the social setting is shown in the lower portion of the screen and the user needs to press a button ("Next") to see the next highest match (FIG. 5(b)). For our study, we setup an environment with 10 gender-based profiles preferring heterosexual matches, and focused on 2 males and 1 female who are constantly polling other profiles for a match.

Figure 12:
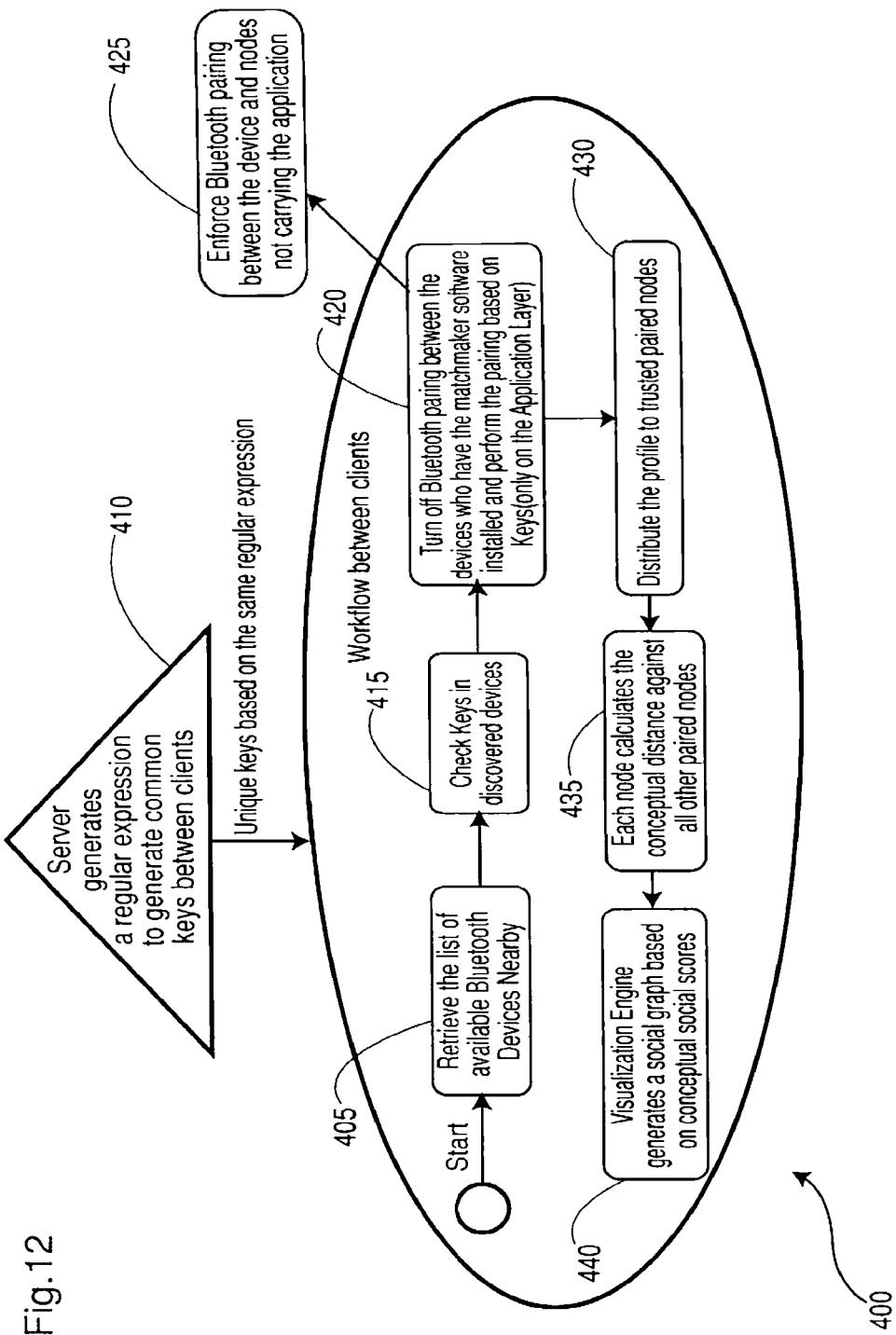
FIG. 12 shows a flow-chart depicting another method for social network that can be implemented using the system of FIG. 1.

To provide further perspective and detail, FIG. 12 shows a method of social networking represented in the form of a flow-chart and indicated at reference 400. Method 400 is performed using system 50. The blocks in method 400, except for block 410, are performed by devices 70 utilizing their copies local matchmaker applications 136 and visualization engines 138. Block 410 in method 400 is performed by server 62, which generates a regular expression to generate common keys that are used between devices 70. The keys referenced in block 410 correspond to the keys referenced at blocks 196, 200, 206 and 244 of method 180.

Block 405 represents the activity of searching for all nearby devices 70 by each device 70. Block 405 generally corresponds to blocks 184 and 192 of method 180.

Block 415 represents the activity of shared key exchanges by each discovered device 70 to verify the existence of matchmaker applications 136 on each discovered device 70. It will now be appreciated that in system 50, devices 70-1, 70-2 and 70-3 will discover each other, and that devices 70-4, 70-5 and 70-6 will discover each other. Block 415 generally corresponds to blocks 196, 200, 208 and 212 method 180.

Block 420 represents the formal overriding of the traditional Bluetooth pairing process between devices 70, in favor of allowing the functionality of matchmaker application 136 to utilize the Bluetooth stack for the purpose of fulfilling the social networking functions as described herein. Block 425 is invoked to the extent that each device 70 does not locate the matchmaker application 136 on another device 70. Block 425 enforces the traditional Bluetooth pairing process between devices, in accordance with known Bluetooth pairing procedures according to the prior art.

Block 430 represents the exchanging of profiles between all of the devices 70 which are in communication with each other and which have verified with each other and that they are each executing matchmaker application 136. Block 430 generally corresponds to blocks 220 and 224 of method 180.

Block 435 represents the determination of a conceptual distance between devices 70 that have each exchanged profiles with each other. Block 435 can be performed by each individual device 70. Block 435 generally corresponds to blocks 228 and 232 of method 180.

Block 440 represents the indication of visualization engine 138 in order to create a social map of the type shown in FIGS. 6, 7 and 8.

It can be noted that in method of 400, once block 440 is complete, method 400 cycles back to block 405, and in this manner, the social map is continually updated.

While the foregoing describes certain embodiments, it will now be apparent that combinations, subsets, and/or variations of those embodiments are contemplated.

The invention claimed is:

1. A system for social networking comprising:
a server connected to a network;
a plurality of mobile devices;
   wherein each of said mobile devices is configured to connect to said server via said network using a first communication protocol,
   wherein each of said mobile devices is further configured to be connectable directly to each other using a second communication protocol,
   wherein each of said mobile devices is further configured to maintain in memory of each said mobile device data representing a profile of a user of said mobile device,
   wherein each of said mobile devices is further configured to send said profile to said server using said first communication protocol in response to a determination that at least one of said other mobile devices is directly connectable thereto using said second communication protocol;
   wherein said server is configured to use a weighted algorithm to generate a first set of matches between said profiles received from each of said mobile devices; and
   wherein each of said mobile devices is further configured to display a social map of said mobile devices, said social map representing each of said mobile devices as a node separated from each other node by a conceptual distance based on a function of said first set of matches.

2. The system of claim 1, wherein said second communication protocol is selected from the group consisting of IEEE 802.15 and a peer-to-peer variant of IEEE 802.11.

3. The system of claim 1, wherein said second communication protocol is Bluetooth.

4. The system of claim 1, wherein said server is configured to maintain a profile schema corresponding to said profiles.

5. The system of claim 1, further comprising:
a first service area; and
a second service area,
   wherein said server is configured to maintain a first profile schema for mobile devices located within said first service area, and a second profile schema for mobile devices located within said second service area.

6. The system of claim 4, wherein said server is configured to maintain an application for generating said profile schema.

7. The system of claim 4, wherein each of said mobile devices is configured to download said profile schema and to receive user input corresponding to said profile in accordance with said schema.

8. The system of claim 1, wherein each of said mobile devices is further configured to connect directly to each other using said second communication protocol with a shared key.

9. The system of claim 1, wherein each of said mobile devices is further configured to exchange said profile with said at least one of said other mobile devices.

10. The system of claim 1, wherein each of said mobile devices is further configured to receive input from a user to modify said weighted algorithm to generate a second set of matches between said profiles.

* * * * *